United States Patent [19]

Taniura

[11] Patent Number: 5,122,897
[45] Date of Patent: * Jun. 16, 1992

[54] OPTICAL BEAM MODULATING DEVICE

[75] Inventor: Hiroshi Taniura, Ibaragi, Japan

[73] Assignee: Think Laboratory Co., Ltd., Chiba, Japan

[*] Notice: The portion of the term of this patent subsequent to Oct. 2, 2007 has been disclaimed.

[21] Appl. No.: 286,633

[22] Filed: Dec. 16, 1988

[30] Foreign Application Priority Data

May 20, 1988 [JP] Japan .................................. 63-123605

[51] Int. Cl.⁵ .......................... G02F 1/11; G02F 1/33
[52] U.S. Cl. .................................... 359/286; 359/285
[58] Field of Search .............................. 350/358, 353

[56] References Cited

U.S. PATENT DOCUMENTS

| | | | |
|---|---|---|---|
| 3,512,871 | 5/1970 | Zweig | 350/358 |
| 3,731,231 | 5/1973 | Torguet | 350/358 X |
| 4,449,212 | 5/1984 | Reno | 350/358 X |
| 4,541,712 | 9/1985 | Whitney | 350/358 X |
| 4,692,016 | 9/1987 | Genequand | 350/358 X |
| 4,696,551 | 9/1987 | Amano | 350/358 |
| 4,960,320 | 10/1990 | Taniura | 350/358 |

Primary Examiner—Eugene R. LaRoche
Assistant Examiner—Michael B. Shingleton
Attorney, Agent, or Firm—Koda and Androlia

[57] ABSTRACT

An optical beam modulating device used for recording halftone plate duplicate images on a recording material including two multi-channel optical beam modulators, each including a rectangular parallelepiped modulator crystal which has a prescribed number of acoustic electrodes installed on one side surface. The electrodes are installed at equal pitch intervals so that Gauss beams can be directed across the electrodes separately from each other, and the positions at which the electrodes of one modulator are installed are shifted by one-half pitch with respect to the positions at which the acoustic electrodes of the other modulator are installed.

1 Claim, 3 Drawing Sheets

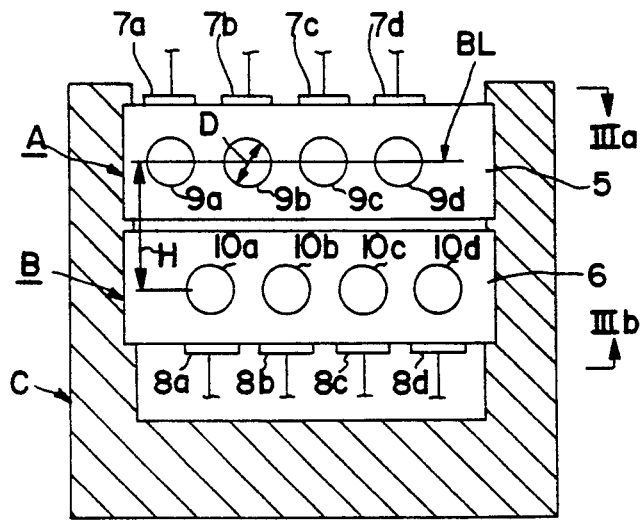
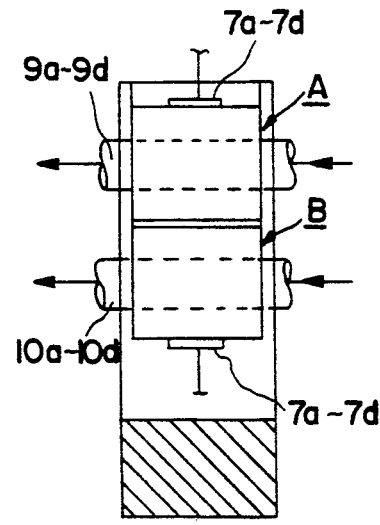
FIG.1(a)  FIG.1(b)
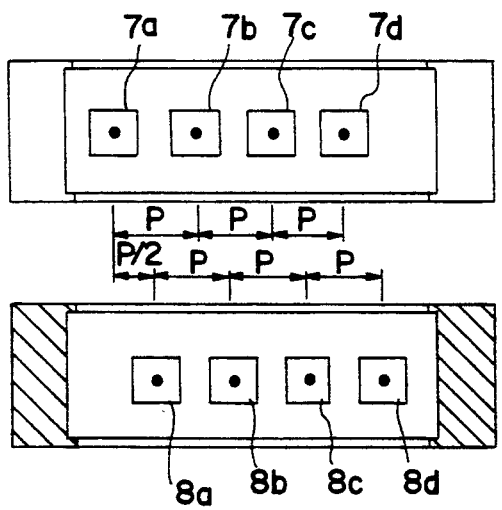
FIG.1(c)
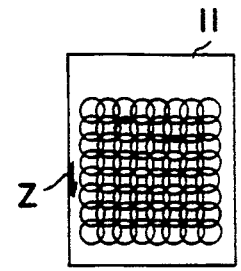
FIG.2(a)
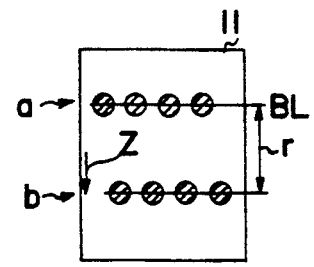
FIG.2(b)

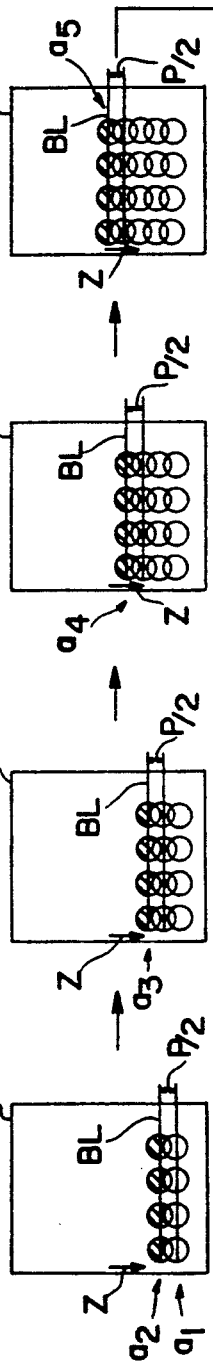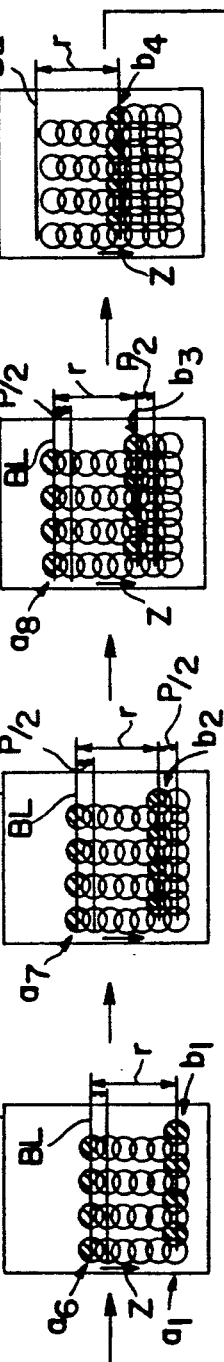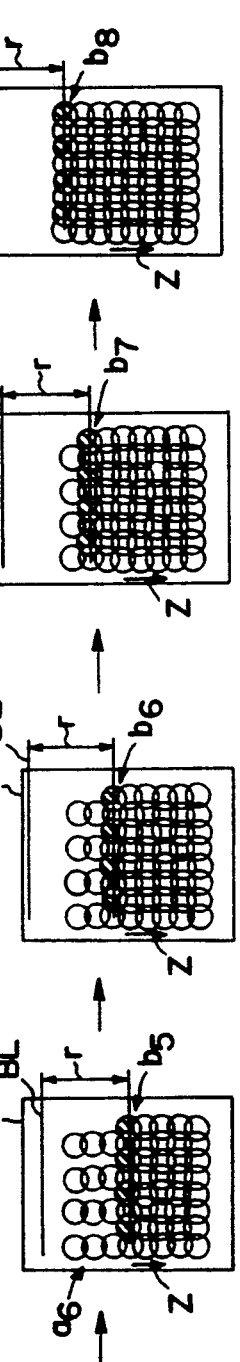

OPTICAL BEAM MODULATING DEVICE

BACKGROUND OF THE INVENTION

1. Field of the Invention

The present invention relates to an optical beam modulating device which is necessary in cases where, for example, halftone plate duplicate images are recorded on a recording material by controlling a light-exposure means in accordance with image signals obtained by the photoelectric of an original image, and especially in cases where halftone plate images are recorded by independently modulating a multiple number of Gauss beams (hereinafter, "Gauss beam" means a beam with an energy level which can cause exposure, the peripheral portion of the beam circle where the energy level is too low to be effective in exposure being excluded) on the basis of image signals.

2. Prior Art

The recording of halftone plate images by the relative scanning of a multiple number of light beams (lined up in a row) across the surface of a recording material, with the light beams being independently modulated on the basis of image signals, has conventionally been performed in the art. In most cases, the multiple number of light beams are obtained by installing a multiple number of totally reflective mirrors and semi-reflective mirrors, and splitting a single light beam generated by an argon laser by reflecting the light beam from the mirrors, or by splitting a single light beam using an optical beam splitter of the type described in Japanese patent application Laid-Open (Kokai) No. 52-122135. The respective light beams thus obtained are independently modulated by means of a multi-channel ultrasonic modulator and then reduced in diameter by means of a crystal optical system and directed onto the surface of a recording material.

FIGS. 3(a), 3(b) and 3(c) illustrate a conventional multi-channel ultrasonic modulator. In the Figures, numeral 1 indicates a modulator crystal, 2 indicate a crystal holder, and 3a through 3h indicate acoustic electrodes. These electrodes are positioned on a side surface of the modulator crystal 1 which runs perpendicular to Gauss beams 4a through 4h, and are installed in two rows with a one-half pitch phase difference between the two rows. The pitch p of adjacent Gauss beams in a case where the beam diameters of four gauss beams are caused to overlap in a square arrangement so that the respective beam circles pass through a central point X as shown in FIG. 4 is equal to the square root of the square of the beam radius $r^2 \times 2$ from the Pythagorean theorem. This is considered to be approximately 0.707 times the beam diameter D of the Gauss beams. If the pitch p is smaller than this value, the point X will not be exposed to the light of the light beams. However, if the pitch of the Gauss beams 4a through 4h is set at p, then the pitch of the acoustic electrodes 3a through 3h is also accurately set at p. The acoustic electrodes 3a through 3h generate ultrasonic waves in accordance with desired image signals for the purpose of forming images of various sizes as aggregations of dots on the recording surface. These electrodes independently modulate the Gauss beams 4a through 4h which are directed so that they traverse the respective acoustic electrodes.

FIG. 5 shows one example of the conditions of an aggregation of dots recorded on the recording surface by exposure. The recording material moves continuously in the direction indicated by arrow Y. The eight dots in row a are exposed first. Next, when the recording material has moved by pitch p in the direction indicated by arrow Y, the eight dots in row b are exposed. Next, when the recording material has again moved by pitch p in the direction indicated by arrow Y, the eight dots in row c are exposed, completing the aggregation of dots illustrated in FIG. 5. The generation of ultrasonic waves by the acoustic electrodes 3a through 3h is interrupted when rows a, b and c are exposed. When the generation of ultrasonic waves is interrupted, the direct passage of the Gauss beams 4a through 4h through the modulator crystal 1 is allowed, so that exposure takes place. On the other hand, when ultrasonic waves are generated, the direct passage of the Gauss beams 4a through 4h is blocked. In this way, the light beams are ultrasonically modulated.

However, although multi-channel ultrasonic modulators of the type mentioned above are designed so that the respective light beams can be independently modulated, the Gauss beams 4a through 4h which pass through the ultrasonic modulator 1 overlap each other. Accordingly, when a light beam corresponding to a given acoustic electrode among the acoustic electrodes 3a through 3h is modulated by the acoustic electrode, the generation of crosstalk interference which cuts the passage of the beam in the adjacent light beams on both sides is essentially unavoidable.

Furthermore, if there is not complete equality and absence of any phase shift between the pitch p of the acoustic electrodes 3a through 3h and the pitch p of the Gauss beams, or if the size of the acoustic electrodes 3a through 3h does not match the beam diameter of the Gauss beams, the abovementioned crosstalk occurs even more conspicuously. Accordingly, the formation of the acoustic electrodes 3a through 3h and the structure and arrangement of the beam splitter which determine the pitch of the Gauss beams must be maintained at a high degree of precision.

Conventionally, furthermore, the number of light beams has been limited to approximately 20 due to heat loading of the modulator crystal. For this reason, a long exposure time has been required.

SUMMARY OF THE INVENTION

One object of the present invention is to provide an optical beam modulating device which makes it possible to modulate the respective light beams independently without generating any crosstalk.

Another object of the present invention is to provide an optical beam modulating device which can independently modulate the respective light beams with the Gauss beams separated so that they do not overlap, but which is nevertheless capable of modulation so that the Gauss beams may overlap in the form of a connected chain on the recording surface.

Still another object of the present invention is to provide an optical beam modulating device which is capable of modulation so that the Gauss beams overlap in the form of a connected chain on the recording surface even without a precise match between the size and pitch of the acoustic electrodes and the beam diameter and pitch of the light beams.

Yet another object of the present invention is to provide an optical beam modulating device in which the number of acoustic electrodes can be greatly increased, so that image resolution can be improved and exposure time shortened.

The above objects of the present invention are accomplished by a unique structure including two multi-channel optical beam modulators installed side by side, each including modulator crystals of rectangular parallelepiped shape, and having a prescribed number of acoustic electrodes installed on one side surface of each of the modulators. The acoustic electrodes are installed at equal pitch intervals so that Gauss beams can be directed across the electrodes separately from each other, and the positions at which the acoustic electrodes of one modulator are installed are shifted by one-half pitch with respect to the positions at which the acoustic electrodes of the other modulator are installed. The acoustic electrodes are constructed so that they independently modulate the Gauss beams which traverse the respective acoustic electrodes on the basis of desired image signals, and the acoustic electrodes of the modulator positioned on the downstream side with respect to a recording surface which is scanned by relative motion are constructed so that they modulate with a delay and thus correct the phase discrepancy of the output beams at the recording surface corresponding to the spacing between the two sets of Gauss beams passing through the two modulators.

BRIEF DESCRIPTION OF THE DRAWINGS

FIG. 1($a$) is a front view of one embodiment of the optical beam modulating device of the present invention;

FIG. 1($b$) is a side view thereof;

FIG. 1($c$) is a composite of two views in the directions indicated by arrows III$a$ and III$b$ in FIG. 1($a$);

FIGS. 2($a$) through 2($n$) constitute a dot generation process diagram which illustrates the relationship between scanning and modulation in the optical beam modulating device of the present invention;

DETAILED DESCRIPTION OF THE INVENTION

Two multi-channel optical beam modulators A and B are installed adjacent to each other, that is, one on top of the other in a holder C, as seen in FIG. 1. Four acoustic electrodes 7$a$ through 7$d$ are installed at equal intervals, pitch P, on the top surface of the modulator A. Furthermore, another four acoustic electrodes 8$a$ through 8$d$ are installed at equal intervals, pitch P, on the bottom surface of the modulator B. The upper acoustic electrodes 7$a$ through 7$d$ are shifted by onehalf pitch with respect to the lower acoustic electrodes 8$a$ through 8$d$.

Figure 3A:
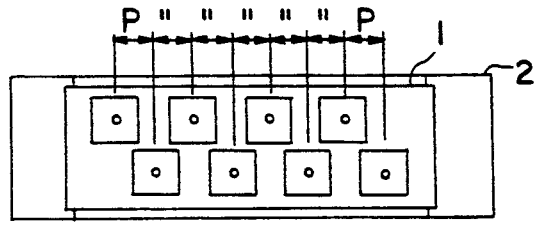
FIGS. 3($a$), 3($b$) and 3($c$) are a plan view, a front view and a side view, respectively, of a conventional optical beam modulating device.
Figure 3B:
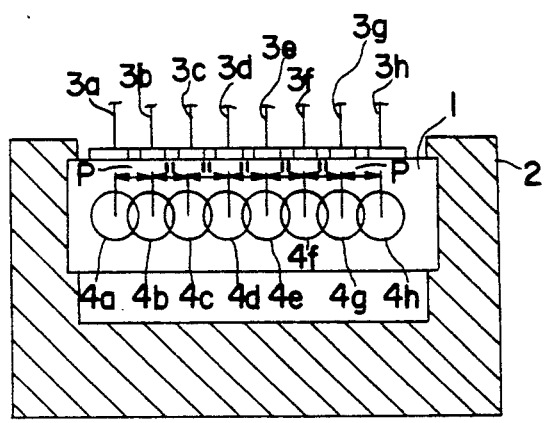
Figure 3C:
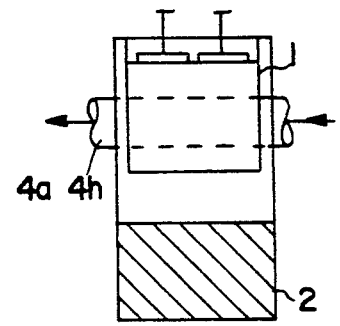
Figure 4:
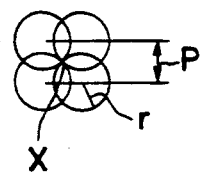
FIG. 4 illustrates the overlapping dimensions of beam circles in a case where four beam circles of equal size positioned at the vertices of a square pass through the central point X of the square.
Figure 5:
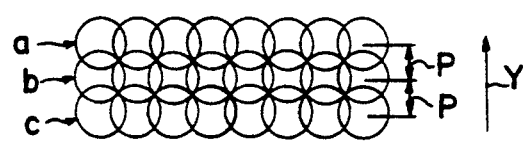
FIG. 5 indicates the overlapping condition of the beam circles exposed by a conventional optical beam modulator.

If the pitch P at which the acoustic electrodes of the respective modulators are installed (the pitch P being equal to the pitch P of the Gauss beams 9$a$ through 9$d$ and the pitch P of the Gauss beams 10$a$ through 10$d$) is set at approximately 1.414 times the beam diameter D of the Gauss beams, then scanning exposure can be accomplished so that four beam circles pass through a central point X as shown in FIG. 4.

The Gauss beams 9$a$ through 9$d$ are separated from the Gauss beams 10$a$ through 10$d$ by the distance H. It is desirable to set the distance H at approximately 0.707 times the beam diameter D of the Gauss beams times an appropriate natural number, so that the output of delay signals to the lower acoustic electrodes 8$a$ through 8$d$ is performed at the same time as the signal output to the upper acoustic electrodes 7$a$ through 7$d$.

For example, in order to obtain the situation illustrated in FIG. 2, it is sufficient to set H at approximately 0.707 times the beam diameter D of the Gauss beams times 5, so that the output delay signals to the lower acoustic electrodes 8$a$ through 8$d$ is delayed by a timing of five rows with respect to the output of signals to the acoustic electrodes 7$a$ through 7$d$. Since the acoustic electrodes 7$a$ through 7$d$ and the acoustic electrodes 8$a$ through 8$d$ are spaced, crosstalk does not occur. Accordingly, these electrodes may be made larger in size than the beam diameter D of the Gauss beams 9$a$ through 9$d$ and 10$a$ through 10$d$.

Furthermore, since the electrodes may be larger than the beam diameter, the pitch at which the electrodes are installed does not require a high degree of precision. With regard to the pitch of the Gauss beams 9$a$ through 9$d$ and 10$a$ through 10$d$, it is necessary to cause the split light beams to be incident so that the pitch is very precise. This can be accomplished, for example, by using two optical beam splitters of the type described in Japanese patent application Laid-Open (Kokai) No. 52-122135.

FIGS. 2($a$) through 2($n$) constitute a dot generation process diagram which illustrates the relationship between scanning and modulation in the optical beam modulating device of the present invention.

FIG. 2($a$) illustrates a state in which 8 dots x 8 dots have been recorded on a recording surface 11 which moves continuously in the direction indicated by arrow Z. This state is obtained by the process illustrated in FIGS. 2($c$) through 2($n$).

FIG. 2($b$) illustrates the arrangement of 8 dots obtained when the acoustic electrodes 7$a$ through 7$d$ and 8$a$ through 8$d$ are simultaneously modulated without any delay modulation of the acoustic electrodes 8$a$ through 8$d$. Line BL in FIG. 1($a$) and line BL in FIGS. 2($b$) through 2($n$) indicate the corresponding position in scanning. In FIG. 2($b$), the four dots in row (a) are produced by the Gauss beams 9$a$ through 9$d$, while the four dots in row (b) are produced by the Gauss beams 10$a$ through 10$d$. As is shown in FIG. 1($a$), the Gauss beams 9$a$ through 9$d$ and 10$a$ through 10$d$ do not overlap; accordingly, no crosstalk can occur.

The spacing r between row (a) and row (b) in FIG. 2($b$) corresponds to the spacing H between the Gauss beams 9$a$ through 9$d$ and the Gauss beams 10$a$ through 10$d$ shown in FIG. 1($a$). In order to cause row (b) to overlap with row (a), row (b) is subjected to delay processing so that the spacing r is eliminated.

For example, assuming that the spacing r in FIG. 2($b$) corresponds to a phase discrepancy of 5 dots, then FIG. 2($c$) illustrates a state in which (i) the four dots in row (a1) have first been exposed by the Gauss beams 9$a$ through 9$d$, after that (ii) the for dots in row (a2) have been exposed by the same Gauss beams after the recording material 11 has moved a distance of p/2 in the direction indicated by arrow Z. Similarly, FIGS. 2($d$) through 2($f$) illustrate respective states in which the four dots in rows (a3), (a4) and (a5) have been exposed by the Gauss beams 9a through 9d after the recording material 11 has moved a distance of p/2 in the direction indicated by arrow Z each time.

FIG. 2(g) illustrates a state in which (i) the four dots in row (a6), which is separated by a distance of r from the row (a1), have been exposed by the Gauss beams 9a through 9d, and (ii) the four dots in the first row (b1) have been exposed by the Gauss beams 10a through 10d (which have been modulated with a delay), so that the dots in row (b1) overlap in the form of a connected chain with the four dots in row (a1).

Similarly, FIGS. 2(h) and 2(i), respectively, indicate states in which row (a7) and row (b2), and row (a8) and row (b3), have been exposed by the Gauss beams 9a through 9d and 10a through 10d. FIGS. 2(j) through 2(n) indicate states in which rows (b4), (b5), (b6), (b7) and (b8) have been exposed by the delay-modulated Gauss beams 10a through 10d; these rows overlap in the form of a connected chain with rows (a4), (a5), (a6), (a7) and (a8), respectively.

As was described above, the optical beam modulating device of the present invention possesses the following merits:

1. Since the acoustic electrodes are spaced, the respective light beams can be independently modulated without any occurrence of crosstalk. Furthermore, since two modulators are installed adjacent to each other, and since the electrodes are shifted by one-half pitch in the direction in which the electrodes are lined up, with a delay modulation applied to one of the rows, the Gauss beams can be modulated so that they overlap on the recording surface.

2. Since the acoustic electrodes are spaced, the size and pitch of the acoustic electrodes do not have to be matched with the beam diameter and pitch of the light beams to a high degree of precision. As long as the light beams are caused to be incident in two rows with a one-half pitch shift between rows (the shift is matched to the pitch of the light beams with a high degree of precision), the Gauss beams can be modulated so that they accurately overlap in the form of a connected chain on the recording surface.

3. Since the acoustic electrodes are spaced, the heat load on the modulator crystal is lightened. Furthermore, since two modulators are installed adjacent to each other, the number of light beams into which the initial light beam is split by the optical beam splitter positioned in front of the modulator can be increased. As a result, the beam diameter of the split light beams can be reduced to a far smaller value than is conventionally possible by the crystal optical system installed following the modulators. Accordingly, the image resolution can be conspicuously improved, and the exposure time can be shortened.

I claim:

1. An optical beam modulating device for recording images on a recording surface which is moving relative to said device, said device characterized in that:

two multi-channel optical beam modulators, each consisting of a modulator crystal which has a rectangular parallelepiped shape and having a plurality of acoustic electrodes installed on one side surface such that each multi-channel optical beam modulator modulates a set of a plurality of parallel light beams, are installed side by side, one of said multi-channel optical beam modulators being located downstream of another of said two multi-channel optical beam modulators in a direction of said relative movement of said recording surface such that said two sets of said plurality of light beams are displaced one from the other;

said plurality of acoustic electrodes are installed at equal prescribed pitch intervals so that light beams can be directed separately from each other, the positions at which said plurality of acoustic electrodes of one modulator are installed being shifted by one-half pitch with respect to positions at which said plurality of acoustic electrodes of the other modulator are installed;

said plurality of acoustic electrodes are constructed so as to independently modulate said plurality of light beams on the basis of desired image signals; and said image signal for said plurality of acoustic electrodes of the one of said two multi-channel optical beam modulators which is positioned in the downstream direction with respect to said recording surface is delayed whereby a phase discrepancy of the output beams at the recording surface corresponding to the spacing between the two sets of said plurality of light beams passing through said two modulators is corrected.

* * * * *